(12) United States Patent
Zolorzano

(10) Patent No.: US 10,864,490 B1
(45) Date of Patent: Dec. 15, 2020

(54) DRINKING VESSEL

(71) Applicant: Fabian Zolorzano, Clifton, NJ (US)

(72) Inventor: Fabian Zolorzano, Clifton, NJ (US)

( * ) Notice: Subject to any disclaimer, the term of this patent is extended or adjusted under 35 U.S.C. 154(b) by 401 days.

(21) Appl. No.: 15/242,458

(22) Filed: Aug. 19, 2016

Related U.S. Application Data

(60) Provisional application No. 62/207,851, filed on Aug. 20, 2015.

(51) Int. Cl.
| | | |
|---|---|---|
| *B01F 7/16* | (2006.01) | |
| *B01F 13/00* | (2006.01) | |
| *A47G 19/22* | (2006.01) | |
| *B65D 43/02* | (2006.01) | |
| *B01F 7/00* | (2006.01) | |
| *B01F 15/00* | (2006.01) | |
| *A47J 31/00* | (2006.01) | |
| *A47J 31/44* | (2006.01) | |

(52) U.S. Cl.
CPC ...... *B01F 13/0022* (2013.01); *A47G 19/2205* (2013.01); *A47J 31/005* (2013.01); *A47J 31/4407* (2013.01); *B01F 7/0025* (2013.01); *B01F 7/162* (2013.01); *B01F 15/00506* (2013.01); *B01F 15/00831* (2013.01); *B65D 43/0202* (2013.01); *B01F 2215/0022* (2013.01)

(58) Field of Classification Search
CPC .................. B01F 13/0022; B01F 15/00506
USPC ........................................... 366/130
See application file for complete search history.

(56) References Cited

U.S. PATENT DOCUMENTS

| | | | | |
|---|---|---|---|---|
| 4,435,084 A | * | 3/1984 | Calhoun ............. | B01F 7/162 366/130 |
| 2015/0374175 A1 | * | 12/2015 | Garr .................. | A47J 43/27 366/130 |

* cited by examiner

*Primary Examiner* — David L Sorkin
(74) *Attorney, Agent, or Firm* — Bruce A. Lev

(57) ABSTRACT

An improved drinking vessel is a drinking cup or glass having a mixing blade located on the interior bottom having a shaft passing through the bottom of the glass to a rotationally separate portion of the glass that can be spun by hand. A screen sets inside the glass just above the mixing blade to prevent ice or other large solids in the glass from contacting the mixing blade.

10 Claims, 3 Drawing Sheets

DRINKING VESSEL

CROSS-REFERENCE TO RELATED APPLICATION

The present application is related to and claims priority from prior provisional application Ser. No. 62/207,851, filed Aug. 19, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of drinking cups and more specifically relates to an improved drinking vessel.

2. DESCRIPTION OF THE RELATED ART

Drinking vessels are made in all kinds of different sizes, shapes, and colors for different purposes and occasions. The different drinking glasses sometimes are designed for suitably holding a particular type of liquid. For instance, when a liquid having a high alcohol content is the beverage of choice, typically a one ounce shot glass is used. When a beverage having low alcohol content is used, such as wine, the glass usually has a little bit larger container though still relatively small compared to the average drinking glass. The glass quite often has a stem to raise the container portion a little higher to compensate for the smaller container and to provide a level of atmosphere.

There are liquids that are mixed together to form beverages that will separate due to having different viscosities or specific gravities and if left setting for any length of time, have to be stirred frequently to prevent stratifying. Other beverages have insoluble solids that will settle out if left unstirred for more than ten to fifteen seconds. It can be annoying to continually have to stir these types of beverages with a spoon to avoid the settling of the solids from the liquid. There should be a more convenient option for drinking these types of beverages.

Ideally, drinking cups should provide the ability to mix liquids and to keep solids from settling out, and yet, would operate reliably and be manufactured at a modest expense. Thus, a need exists for a reliable improved drinking vessel to avoid the above-mentioned problems.

BRIEF SUMMARY OF THE INVENTION

In view of the foregoing disadvantages inherent in the known drinking cup art, the present invention provides a novel improved drinking vessel. The general purpose of the present invention, which will be described subsequently in greater detail, is to provide the ability to mix liquids and to keep solids from settling out.

The improved drinking vessel may comprise a main body portion that includes a base section having a bottom surface, a top surface and a center hole passing therethrough. The center hole includes a sealing means connected around the inner periphery of the center hole and is adapted to prevent liquids from passing through the center hole when the spindle member is attached thereto, and while the spindle member is rotating.

The improved drinking vessel includes at least one side wall that is connected to and extends upwards from the bottom section that forms an interior volume having an open top portion. A stirring mechanism that includes a rotatable platform is adapted to be placed adjacent to the bottom surface of the base section such that it can be rotated by hand. The spindle member is connected at the proximal end to the center portion of the rotatable platform and extends perpendicularly therefrom and is adapted to pass through and fit within the center hole of the base section so that it is able to rotate. The mixing blade is located within the interior volume of the main body portion in proximity to the base section and is releasably connected to a distal end of the spindle member such that when the rotatable platform is rotated, the mixing blade rotates with it. A user preferred liquid or combination of liquids can be placed within the inner volume of the main body portion and be mixed or stirred by hand using the stirring mechanism.

The side wall tapers outwardly from the base portion to the open top portion and is formed having a cylindrical shape. The main body portion is formed from a material chosen from a group of materials consisting of plastic, paper, ceramic, and metal. The mixing blade is formed having a plurality of spaced blade members extending outwardly from the center point. The mixing blade may have four spaced blade members extending outwardly from the center point that forms an X-shape with the end portions of the blade members residing in close proximity to the side wall. The mixing blade is preferably formed from a material chosen from the group of materials consisting of plastic, paper, ceramic, and metal.

The improved drinking vessel may further comprise a removable grill member adapted to be removably attached to the inner surface of the side wall that extends across the inner volume and resides in proximity to and above the mixing blade so that hard materials are prevented from coming contact the mixing blade. The removable grill member is formed from a material chosen from the group of materials consisting of plastic, paper, ceramic, and metal. The improved drinking vessel may further have a lid member adapted to removably connect to the upper edges of the side wall to removably cover the open top portion.

The present invention holds significant improvements and serves as an improved drinking vessel. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved drinking vessel, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a drinking cup and more particularly to an improved drinking vessel as used to provide the ability to mix liquids and to keep solids from settling out.

Generally speaking, an improved drinking vessel is a drinking cup or glass having a mixing blade located on the interior bottom having a shaft passing through the bottom of the glass to a rotationally separate portion of the glass that can be spun by hand. A screen sets inside the glass just above the propeller to prevent ice or other large solids in the glass from contacting the mixing blade.

Figure 1:
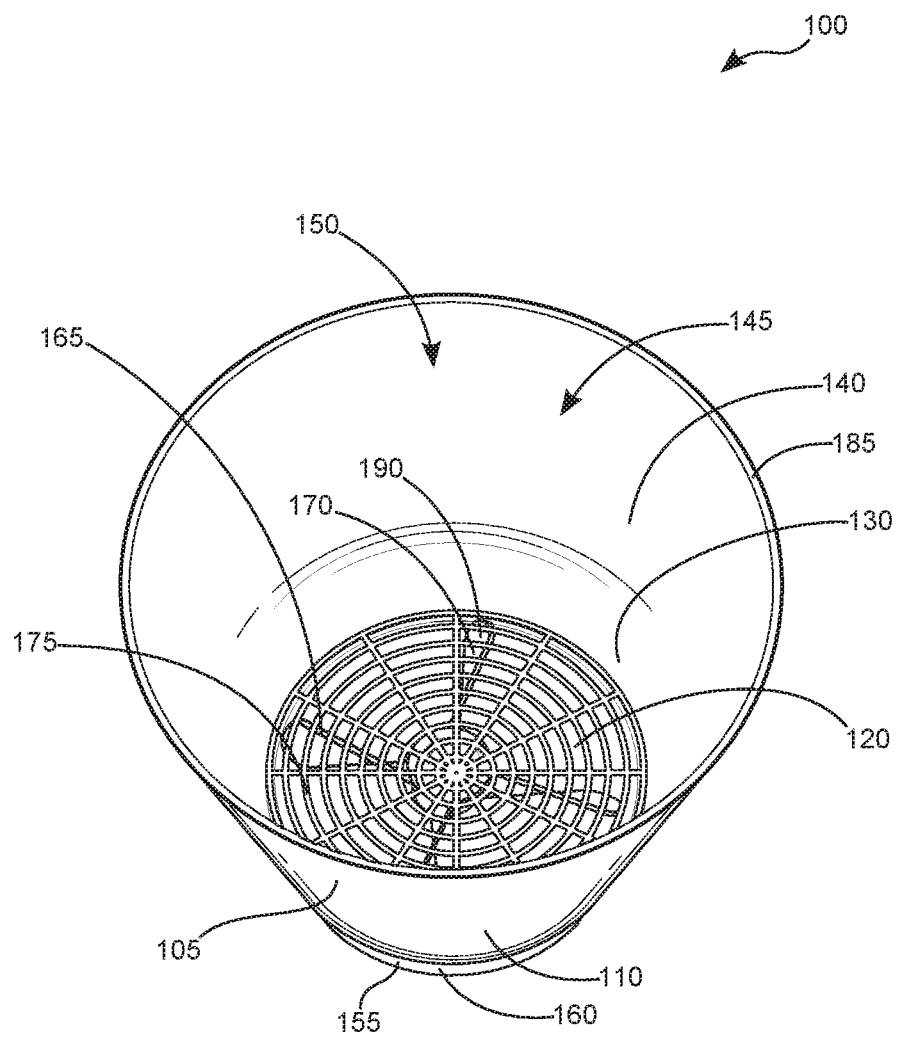
FIG. 1 shows a perspective view illustrating an improved drinking vessel according to an embodiment of the present invention.

Referring to the drawings by numerals of reference there is shown in FIG. 1, shows a perspective view illustrating improved drinking vessel 100 according to an embodiment of the present invention.

Improved drinking vessel 100 may comprise main body portion 105 that includes base section 110 having bottom surface 115, top surface 120 and center hole 125 passing therethrough. Center hole 125 includes a sealing means connected around inner periphery 130 of center hole 125 and is adapted to prevent liquids from passing through center hole 125 when spindle member 135 is attached thereto, and while spindle member 135 is rotating. Improved drinking vessel 100 includes at least one side wall 140 that is connected to and extends upwards from bottom surface 115 that forms interior volume 145 having open top portion 150.

Improved drinking vessel 100 may further comprise removable grill member 175 adapted to be removably attached to inner surface 132 of side wall 140 that extends across interior volume 145 and resides in proximity to and above mixing blade 165 so that hard materials are prevented from coming contact mixing blade 165. Removable grill member 175 is formed from a material chosen from the group of materials consisting of plastic, paper, ceramic, and metal. Improved drinking vessel 100 may further have lid member 180 adapted to removably connect to upper edges 185 of side wall 140 to removably cover open top portion 150.

Figure 2:
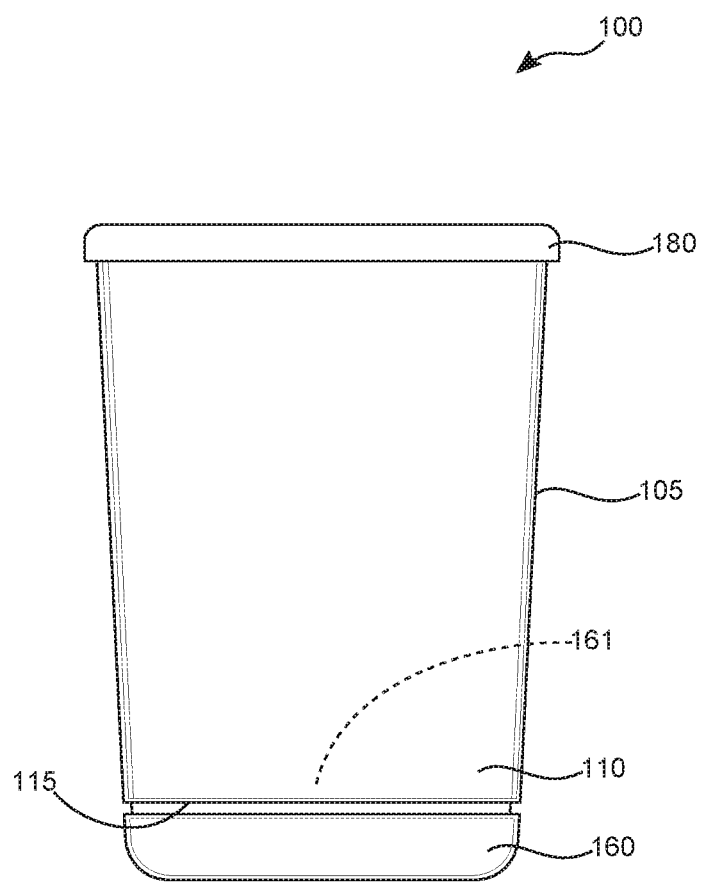
FIG. 2 is another perspective view illustrating the improved drinking vessel according to an embodiment of the present invention of FIG. 1.

Referring now to FIG. 2, is another perspective view illustrating improved drinking vessel 100 according to an embodiment of the present invention of FIG. 1.

Side wall 140 tapers outwardly from base section 110 to open top portion 150 and is formed having a cylindrical shape. Main body portion 105 is formed from a material chosen from a group of materials consisting of plastic, paper, ceramic, and metal. Mixing blade 165 is formed having a plurality of spaced blade members 170 extending outwardly from center point 171. Mixing blade 165 may have four spaced blade members 170 extending outwardly from center point 171 that forms an x-shape with end portions 190 of spaced blade members 170 residing in close proximity to side wall 140. Mixing blade 165 is preferably formed from a material chosen from the group of materials consisting of plastic, paper, ceramic, and metal.

Figure 3:
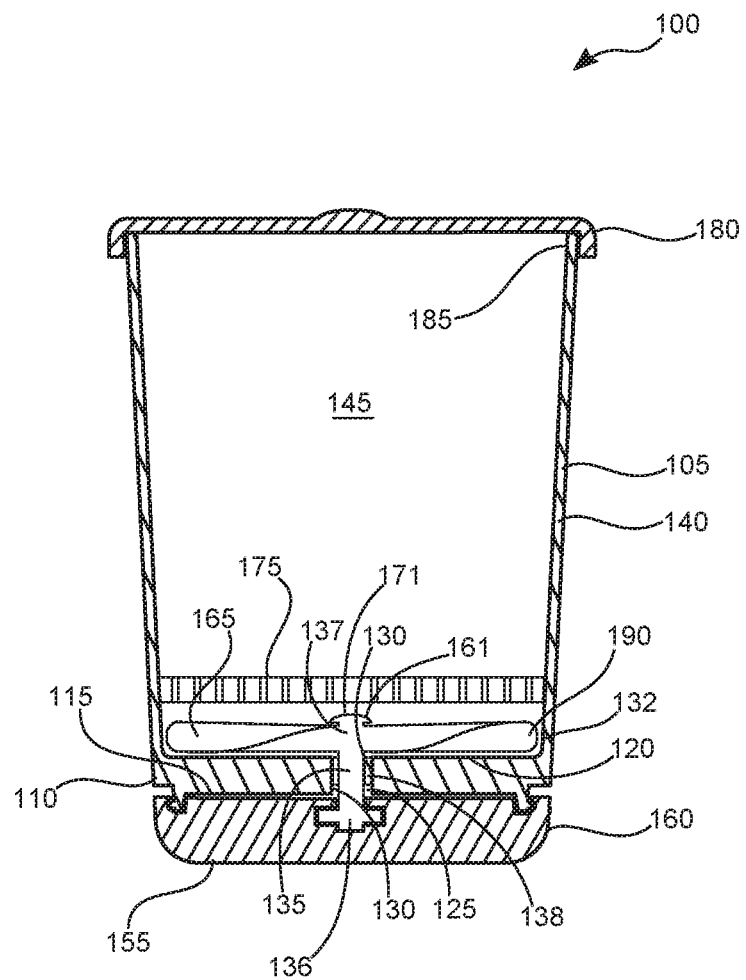
FIG. 3 is a cutaway view illustrating improved drinking vessel according to an embodiment of the present invention of FIG. 1.

Referring now to FIG. 3, is a cutaway view illustrating improved drinking vessel 100 according to an embodiment of the present invention of FIG. 1.

stirring mechanism 155 that includes rotatable platform 160 is adapted to be placed adjacent to bottom surface 115 of base section 110 such that it can be rotated by hand. spindle member 135 is connected at proximal end 136 to center portion 161 of rotatable platform 160 and extends perpendicularly therefrom and is adapted to pass through and fit within center hole 125 of base section 110 so that it is able to rotate. mixing blade 165 is located within interior volume 145 of main body portion 105 in proximity to base section 110 and is releasably connected to distal end 137 of spindle member 135 such that when rotatable platform 160 is rotated, mixing blade 165 rotates with it. A user preferred liquid or combination of liquids can be placed within interior volume 145 of main body portion 105 and be mixed or stirred by hand using stirring mechanism 155.

Improved drinking vessel 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved drinking vessel comprising:
   a main body portion including;
     a base section including;
       a bottom surface;
       a top surface; and
       a center hole;
         wherein said center hole is adapted to include a seal connected around an inner periphery and adapted to prevent liquids from passing through said center hole when a spindle member is located and rotated therein;
     at least one side wall;
       wherein said at least one side wall is connected to and extends upwards from said bottom section and forms an interior volume; and
     an open top portion;
   a stirring mechanism including;
     a rotatable platform;
       wherein said rotatable platform is adapted to be placed adjacent said bottom surface of said base section, and is adapted to be rotated by hand;
     a spindle member;
       wherein said spindle member is connected at a proximal end thereof to a center portion of said rotatable platform and extends perpendicularly therefrom; and
       wherein said spindle member is adapted to pass through and fit and rotate within said center hole of said base section; and
     a mixing blade;
       wherein said mixing blade is located within said interior volume of said main body portion in proximity to said base section; and
       wherein said mixing blade is releasably connected to a distal end of said spindle member, such that when said rotatable platform is rotated said mixing blade rotates therewith; and
     a removable grill member;
       wherein said removable grill member is removably attached to an inner surface of said at least one side wall, extends across said inner volume, and is removably attached adjacent to and above said mixing blade, and adapted such that a user's hand and hard materials cannot contact said mixing blade;
   wherein at least one liquid can be placed within said inner volume of said main body portion and be mixed or stirred by hand using said stirring mechanism.

2. The improved drinking vessel of claim 1, wherein said at least one side wall tapers outwardly from said base portion to said open top portion.

3. The improved drinking vessel of claim 1, wherein said at least one side wall is formed having a cylindrical shape.

4. The improved drinking vessel of claim 1, wherein said main body portion is formed from a material chosen from a group of materials consisting of plastic, paper, ceramic, and metal.

5. The improved drinking vessel of claim 1, wherein said mixing blade is formed having a plurality of spaced blade members.

6. The improved drinking vessel of claim 5, wherein said mixing blade is formed having a four spaced blade members forming an X-shape.

7. The improved drinking vessel of claim 1, wherein said mixing blade extends outwardly from said spindle member a distance such that an end portion resides in close proximity to said at least one side wall.

8. The improved drinking vessel of claim 1, wherein said mixing blade is formed from a material chosen from a group of materials consisting of ceramic and metal.

9. The improved drinking vessel of claim 1, wherein said removable grill member is formed from a material chosen from a group of materials consisting of ceramic and metal.

10. The improved drinking vessel of claim 1, further comprising a lid member adapted to removably connect to upper edges of said at least one side wall to removably cover said open top portion.

* * * * *